US 7,492,670 B2

(12) United States Patent
Parees et al.

(10) Patent No.: US 7,492,670 B2
(45) Date of Patent: Feb. 17, 2009

(54) APPARATUS AND METHOD FOR HANDLING CALENDAR DATES IN A NON-CALENDAR SYSTEM SPECIFIC MANNER

(75) Inventors: Benjamin Michael Parees, Raleigh, NC (US); Phillip J. Rau, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 1195 days.

(21) Appl. No.: 10/696,222

(22) Filed: Oct. 29, 2003

(65) Prior Publication Data
US 2005/0094494 A1 May 5, 2005

(51) Int. Cl.
*G04B 19/24* (2006.01)
*G04C 17/00* (2006.01)
(52) U.S. Cl. .......................... 368/29; 705/26
(58) Field of Classification Search .............. 368/29; 705/26–28
See application file for complete search history.

(56) References Cited

U.S. PATENT DOCUMENTS

| 5,719,826 | A | 2/1998 | Lips | 368/29 |
| 5,764,597 | A * | 6/1998 | Shih | 368/29 |
| 5,793,716 | A | 8/1998 | Lips | 368/28 |
| 5,926,814 | A | 7/1999 | Fridman | 707/6 |
| 6,044,219 | A | 3/2000 | Lips | 717/106 |
| 6,108,640 | A * | 8/2000 | Slotznick | 705/26 |
| 6,116,656 | A | 9/2000 | Glassman | 283/114 |
| 7,349,920 | B1 * | 3/2008 | Feinberg et al. | 707/102 |

* cited by examiner

*Primary Examiner*—Edwin A. Leon
*Assistant Examiner*—Thanh S Phan
(74) *Attorney, Agent, or Firm*—Duke W. Yee; Bruce Clay; Rudolf O. Siegesmund (57) ABSTRACT

A method for displaying events in a plurality of calendar systems. The Custom Calendar System Program (CCSP) herein allows a user to create a custom calendar system by changing the length and names of the year, month, week, or day of any calendar system. The Event Conversion Program (ECP) herein translates the date for an event into a generic date and stores the event with the generic date. When the user changes the displayed time period or calendar system, the Display Program (DP) herein displays the new calendar system and/or time period and determines which events occur on the displayed time period. The DP translates only the events which occur in the displayed time period into the displayed calendar system dates and displays those events on the displayed calendar. A date caching file allows the invention to minimize the number of translation calculations.

7 Claims, 9 Drawing Sheets

APPARATUS AND METHOD FOR HANDLING CALENDAR DATES IN A NON-CALENDAR SYSTEM SPECIFIC MANNER

FIELD OF THE INVENTION

The present invention relates generally to calendar systems and specifically to a computer program for creating, translating, and displaying a plurality of calendar systems and events.

BACKGROUND OF THE INVENTION

Several different calendar systems exist in the world today. While the majority of the Western world uses the Gregorian calendar system, other calendar systems are used in the Middle East and the Far East. For example, the Chinese calendar is used in many East Asian and Southeast Asian countries. The Jewish calendar is the official calendar of Israel. The Islamic calendar is the official calendar of Saudi Arabia and many other Islamic countries. The Indian calendar is the official calendar of India. Several other types of calendars are used by various religious, financial, and industrial organizations to suit specific purposes. Each calendar system is unique in the naming and organization of days, weeks, months, and years. A summary of the organization of some of the calendar systems is illustrated in table 1 below:

TABLE 1

| Calendar System | Number of days per year | Number of months per year | Number of days per month |
|---|---|---|---|
| Bahai | 365-366* | 19** | 19 |
| Chinese | 353-355, 383*-385* | 12-13* | 29-30 |
| Gregorian | 365-366* | 12 | 28-31 |
| Indian | 365-366* | 12 | 30-31 |
| Islamic | 354-355* | 12 | 29-30 |
| Jewish | 353-355, 383*-385* | 12-13* | 29-30 |

*Denotes leap year;
**The Bahai calendar system year has four intercalendary days between the eighteenth and nineteenth months (five intercalendary days in a leap year)

Modern conveniences such as air travel have enabled people to move to different regions of the world. In many instances, the country that a person has moved to does not use the same calendar system as the person's home country. In such cases, it is necessary to translate the local calendar system to the person's home country calendar system. Calendar system translations are also needed by organizations that do business through the world. Therefore, a need exists in the art for a method for translating from one calendar system to another.

The prior art has previously addressed the problem of translating one calendar system into another. For example, U.S. Pat. No. 5,793,716 (the '716 patent) entitled "Date Conversions with 360-Day-Year-Calendar" discloses a method for translating between a Gregorian calendar and a calendar system containing three hundred sixty days per year. The '716 patent does not disclose a method for translating between any other calendar systems. Therefore, a need still exists for a method for translating between a plurality of calendar systems other than a Gregorian calendar system and a 360-day-year calendar system.

Because of the various subtleties in many of the calendar systems, it is preferable to create a translation system in which the number of calculations required to translate one calendar system into another calendar system is minimized. The minimization of the number of translation calculations can be accomplished by using a generic calendar system and translating between the generic calendar system and the plurality of other calendar systems. The prior art has previously addressed the issue of creating a generic calendaring system. For example, U.S. Pat. No. 6,116,656 (the '656 patent) entitled "Perpetual Coded Calendar" discloses a calendar system in which the entire year is depicted on a seven by thirty-one matrix. The matrix contains colored dots that indicate the day of the week and the month of the year. The '656 patent only applies to a Gregorian calendar. The '656 patent does not disclose a method for translating the colored dot matrix into any other calendar systems.

U.S. Pat. No. 5,926,814 (the '814 patent) entitled "System and Method for Processing a New Calendar System" discloses a method for creating a Consist calendar system. The Consist calendar system is identical to the Gregorian calendar system with the exception that the Consist year is a three digit number equal to the Gregorian year minus 1,800. However, the '814 patent fails to address the issue of translating from the Consist calendar system to any non-Gregorian calendar systems (i.e. calendar systems that do not contain a 365-day-year). The '814 patent also fails to disclose a method for translating dates in one non-Gregorian calendar system to dates in another non-Gregorian calendar system.

U.S. Pat. No. 5,719,826 (the '826 patent) entitled "Calendaring System" discloses a calendar system which counts the number of days since Jan. 1, 0001. The '826 patent discloses an algorithm which predicts the occurrence of leap years and thus can predict the day of the week upon which a specific date occurs. The '826 patent also discloses a method for translating a date in an absolute calendar system into a Gregorian format. However, the '826 patent fails to address the issue of translating from the absolute calendar system to any non-Gregorian calendar systems (i.e. calendar systems that do not contain a 365 day year). The '826 patent also fails to disclose a method for translating dates in one non-Gregorian calendar system to dates in another non-Gregorian calendar system.

U.S. Pat. No. 6,108,640 (the '640 patent) entitled "System for Calculating Occasion Dates and Translating Between Different Calendar Systems, and Intelligent Agent for Using Same" discloses a translation system between Gregorian and non-Gregorian calendars. The '640 patent discloses a formula for translating a specific date in one calendar system to another. The '640 patent stores all events in the Gregorian calendar system and translates the dates to the required calendar system. Although the '640 patent discloses a useful method for translating a date in one calendar system to a date in another calendar system, the '640 patent fails to disclose a method for displaying a calendar system with a plurality of user-defined events. In other words, a user cannot use the '640 patent's disclosure to discern the number of days per year, number and names of the months of the year, number of days per month, and number and name of the days of the week in the foreign calendar system. The user also cannot view his event entries in the new calendar system. Therefore, a need still exists for a method of storing events which are entered in a plurality of different date formats and in which the events can be included in a displayed calendar systems.

Businesses also have needs for customizable calendar systems. Customized calendar systems are used by the petrochemical processing industry, the financial industry, and various other industries. Businesses that create customized calendar systems typically do so because they desire more uniformity in the weeks, months, or years than is offered with the Gregorian calendar system. However, the prior art has not disclosed a method for creating a customizable calendar system in which the calendar system can be automatically translated into another calendar system. Therefore, a need exists for a method for creating a custom calendar system and translating the custom calendar system into a plurality of other calendar systems.

Another important aspect of calendar systems is the ability to easily integrate with organizational software. Organizational software is well known in the art as evidenced by computer programs such as OUTLOOK®, LOTUS NOTES™, and PALM® OS. Because at least one of these programs operates on a majority of the world's computers, a calendar system translation tool which is integratable with these software programs would be especially beneficial. One of the objectives of these programs is to limit the number of calculations made by the processors executing the software program. The need to limit the number of calculations is especially high in computers with limited battery power such as laptops and Personal Digital Assistants (PDAs). Therefore, a need exists in the art to reduce the total number of required calculations to translate one calendar system into another.

While the prior art solutions address many of the translation problems between calendar systems, no prior art solution addresses all of the needs identified above. Consequently, a need exists in the art for a method for storing a plurality of events in a generic calendar system, displaying a non-Gregorian calendar system, and displaying the stored events on the displayed calendar system. A need also exists for a method for creating customizable calendar systems in which the user can designate the number of days per year, the number of months per year, the number of days per month, the number of days per week, and the names of the years, months, and days. Finally, a need exists for a method of reducing the required number of translation algorithms and the overall number of calculations required to translate one calendar system into another.

SUMMARY OF THE INVENTION

The present invention is a method for storing events in generic calendar system and displaying the events in a plurality of calendar systems. The software embodiment of the present invention comprises a Menu Selection Program (MSP), a Configuration Program (CP), a Custom Calendar System Program (CCSP), an Event Conversion Program (ECP), and a Display Program (DP). The MSP allows the user to choose one of the other programs from the main menu. The CP allows the user to configure the calendar system and time period to be displayed on the GUI. The CP also allows the user to select the reference date and set the current date and time. The CCSP allows the user to create a customized calendar system or modify an existing calendar system.

The ECP accepts user input of a date and event. The ECP translates the selected date for the event into a generic date using a translation algorithm. The ECP also stores the event in an events file with the generic date. The DP accepts user input which changes the displayed time period or calendar system. The DP displays the new calendar system and/or time period and determines which events occur on the displayed time period. The DP checks a date caching file for previously translated dates. The DP translates only the events which occur in the displayed time period and are not in the date caching file into the displayed calendar system dates and displays those events on the displayed calendar.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

As used herein, the term "calendar system" shall mean a system for organizing days, weeks, and months into years and providing for a systematic progression of years.

As used herein, the term "computer" shall mean a machine having a processor, a memory, and an operating system, capable of interaction with a user or other computer, and shall include without limitation desktop computers, notebook computers, personal digital assistants (PDAs), servers, handheld computers, and similar devices.

As used herein, the term "date caching file" shall mean a computer file containing translations between generic dates and dates in other calendar systems.

As used herein, the term "event file" shall mean a computer file containing a list of events and the generic dates upon which the events occur.

As used herein, the term "generic calendar system" shall mean a calendar system in which each date is a single integer and in which does not contain years, months, or weeks.

As used herein, the term "reference date" shall mean a single day used to coordinate translation from one calendar system to another calendar system.

As used herein, the term "time period" shall mean a single year, month, week, or day of a calendar system.

As used herein, the term "translate" shall mean to convert a time period in one calendar system to a time period in another calendar system.

As used herein, the term "translation algorithm" shall mean a formula for translating a time period in one calendar system to a time period in another calendar system.

Figure 1:
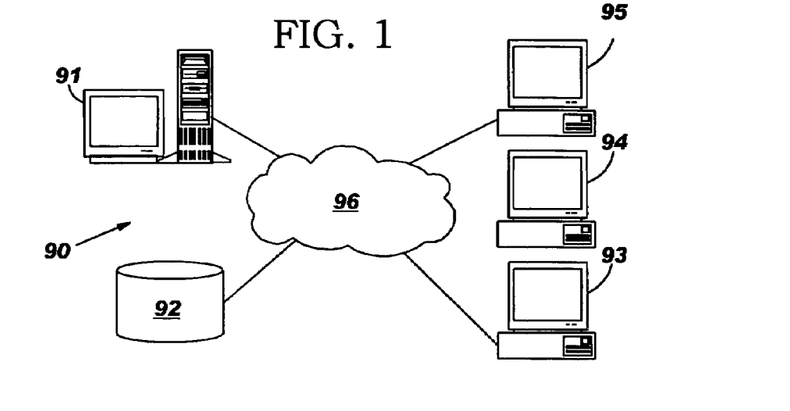
FIG. 1 is an illustration of a computer network used to implement the present invention.

FIG. 1 is an illustration of computer network 90 associated with the present invention. Computer network 90 comprises local computer 95 electrically coupled to network 96. Local computer 95 is electrically coupled to remote computer 94 and remote computer 93 via network 96. Local computer 95 is also electrically coupled to server 91 and database 92 via network 96. Network 96 may be a simplified network connection such as a local area network (LAN) or may be a larger network such as a wide area network (WAN) or the Internet. Furthermore, computer network 90 depicted in FIG. 1 is intended as a representation of a possible operating network containing the present invention and is not meant as an architectural limitation.

Figure 2:
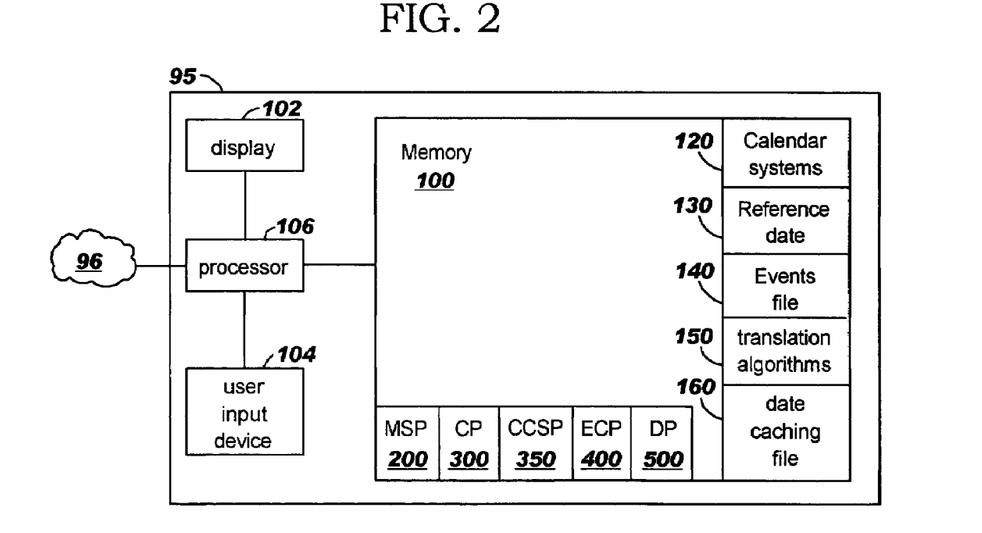
FIG. 2 is an illustration of a computer, including a memory and a processor, associated with the present invention.

The internal configuration of a computer, including connection and orientation of the processor, memory, and input/output devices, is well known in the art. The present invention is a methodology that can be embodied in a computer program. Referring to FIG. 2, the methodology of the present invention is implemented on software by Menu Selection Program (MSP) 200, Configuration Program (CP) 300, Custom Calendar System Program (CCSP) 350, Event Conversion Program (ECP) 400, and Display Program (DP) 500. MSP 200, CP 300, CCSP 350, ECP 400, and DP 500 described herein can be stored within the memory of any computer depicted in FIG. 1. Alternatively, MSP 200, CP 300, CCSP 350, ECP 400, and/or DP 500 can be stored in an external storage device such as a removable disk, a CD-ROM, or a USB storage device. Memory 100 is illustrative of the memory within one of the computers of FIG. 1. Memory 100 also contains calendar systems 120, reference date 130, events file 140, translation algorithms 150, and date caching file 160. The present invention may interface with calendar systems 120, reference date 130, events file 140, translation algorithms 150, and date caching file 160 through memory 100. As part of the present invention, the memory 100 can be configured with MSP 200, CP 300, CCSP 350, ECP 400, and/or DP 500. Processor 106 can execute the instructions contained in MSP 200, CP 300, CCSP 350, ECP 400, and/or DP 500. Processor 106 is also able to display data on display 102 and accept user input on user input device 104. Processor 106, user input device 104, display 102, and memory 100 are part of a computer such as local computer 95 in FIG. 1. Processor 106 can communicate with other computers via network 86.

In alternative embodiments, MSP 200, CP 300, CCSP 350, ECP 400, and/or DP 500 can be stored in the memory of other computers. Storing MSP 200, CP 300, CCSP 350, ECP 400, and/or DP 500 in the memory of other computers allows the processor workload to be distributed across a plurality of processors instead of a single processor. Further configurations of MSP 200, CP 300, CCSP 350, ECP 400, and/or DP 500 across various memories are known by persons of ordinary skill in the art.

As previously stated, calendar programs are well known in the art. The present invention is an improved calendar program. The present invention may be a method, a stand alone computer program, or a plug-in to an existing computer program. Persons of ordinary skill in the art are aware of how to configure computer programs, such as those described herein, to plug into an existing computer program.

Figure 3:
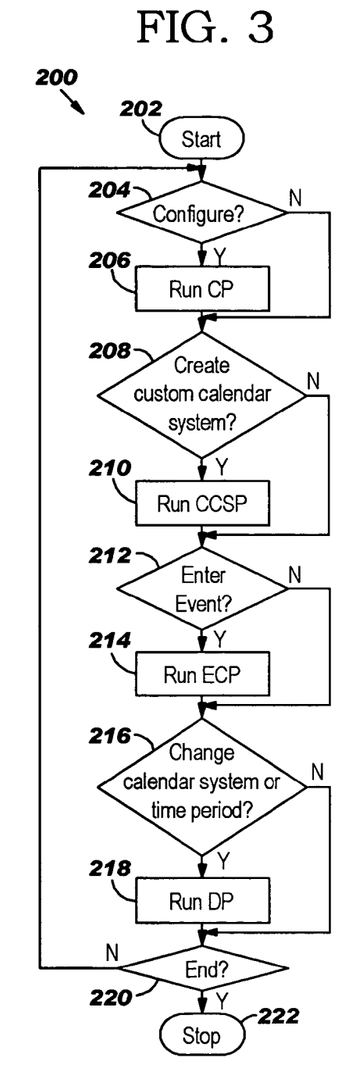
FIG. 3 is an illustration of the logic of the Menu Selection Program (MSP) of the present invention.

Turning to FIG. 3, the logic of Menu Selection Program (MSP) 200 is illustrated. MSP 200 is a program which allows a user to navigate through a drop down menu on a graphical user interface (GUI). Drop down menus are well known in the computer arts. Persons of ordinary skill in the art are aware of other types of menus that may be used in substitution of a drop down menu. MSP 200 starts (202) when the user starts the calendar program of the present invention. MSP 200 then determines if the user wants to configure the calendar system (204). If the user does not want to configure the calendar system, MSP 200 proceeds to step 208. If the user wants to configure the calendar system, then MSP 200 runs CP 300 (206). SMP 300 then determines if the user wants to create a custom calendar system (208). If the user does not want to create a custom calendar system, MSP 200 proceeds to step 212. If the user wants to create a custom calendar, MSP 200 runs CCSP 350 (210). SMP 300 then determines if the user wants to enter an event (212). If the user does not want to enter an event, MSP 200 proceeds to step 216. If the user wants to enter an event, MSP 200 runs ECP 400 (214). MSP 200 then determines if the user wants to change the displayed calendar system or time period (216). If the user does not want to change the calendar system or time period, the MSP 200 proceeds to step 220. If the user wants to change the calendar system or time period, MSP 200 runs DP 500 (218). MSP 200 then determines if the user wants to quit (220). If the user does not want to quit, MSP 200 returns to step 204. If the user wants to quit, MSP 200 ends (222).

Figure 4:
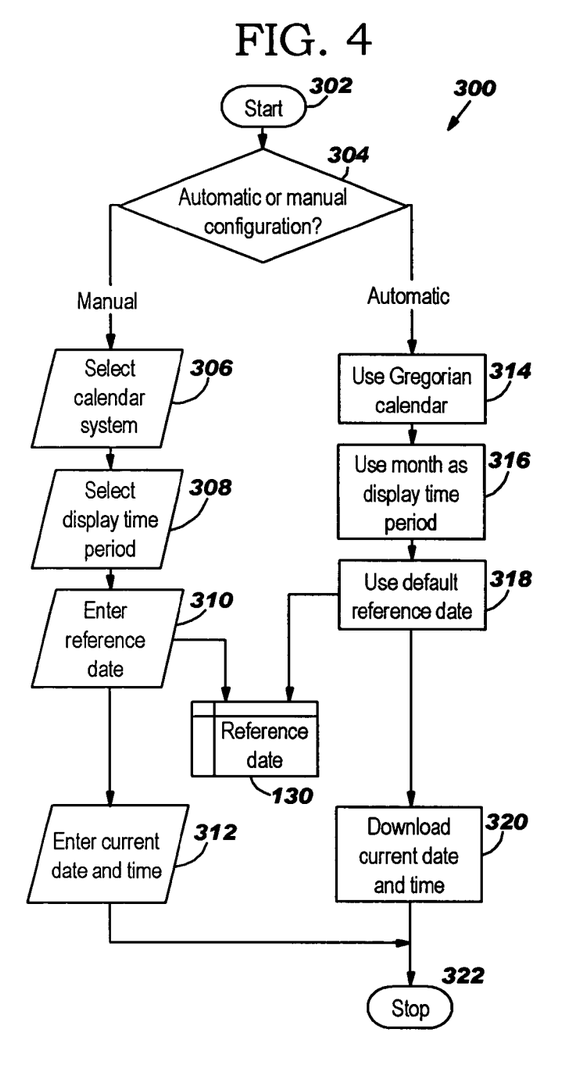
FIG. 4 is an illustration of the logic of the Configuration Program (CP) of the present invention.

Turning to FIG. 4, the logic of Configuration Program (CP) 300 is illustrated. CP 300 is a program that allows the user to configure the settings for the present invention. CP 300 starts (302) when invoked by MSP 200. SP 300 determines if the user wants to automatically configure the calendar system or if the user wants to manually configure the calendar system (304). If the user wants to manually configure the calendar system, the user selects the calendar system from a menu of available calendar systems (306). The calendar systems may be one of calendar systems 120 in FIG. 2. The user then selects the time period the user wants to display on the GUI (308). Possible time periods are a year, a month, a week, or a day. Persons of ordinary skill in the art are aware of other possible time periods. The user then enters the reference date (310). The reference date is the day in the calendar system which corresponds to day zero in the generic calendar system. The reference date may be like reference date 130 in FIG. 2. If the calendar has a previously defined reference date, then there is no need for the user to define a reference date. There is no need to define the reference date because the reference date is a fixed value within the calendar system. CP 300 can read the supplied reference date when the calendar is selected. The user then enters the current date and time (312). CP 300 then ends (322).

If at step 314 the user chooses automatic configuration, CP 300 selects the calendar system as the Gregorian calendar system (314). CP 300 then selects a month as the display time period (316). CP 300 then selects Dec. 31, 2002 as the reference date (318). If the calendar has a previously defined reference date, then there is no need for CP 300 to define a reference date. There is no need to define the reference date because the reference date is a fixed value within the calendar system. CP 300 can read the supplied reference date when the calendar is selected. CP 300 then downloads the current date and time from network 96, which may be the Internet (320). CP 300 then ends (322).

Figure 5:
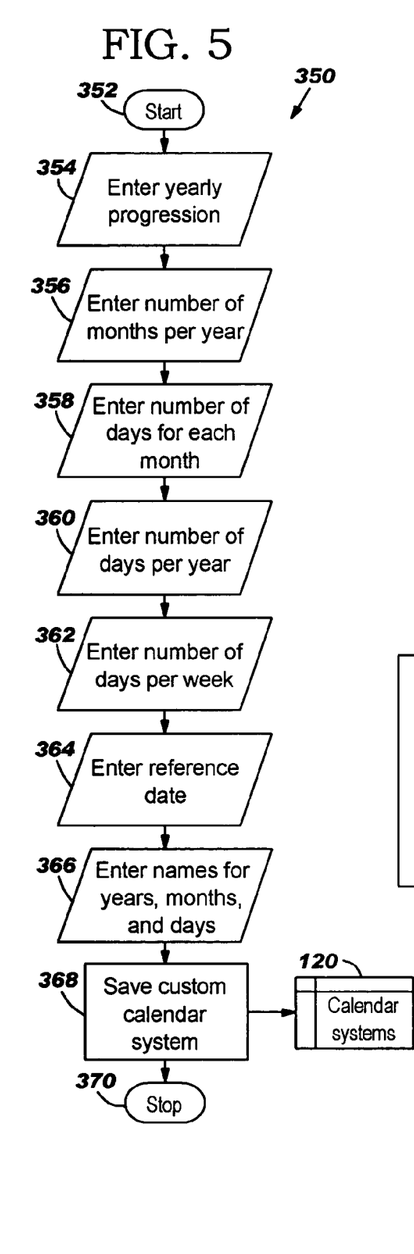
FIG. 5 is an illustration of the logic of the Custom Calendar System Program (CCSP) of the present invention.

Turning to FIG. 5, the logic of the Custom Calendar System Creation Program (CCSP) 350 is illustrated. CCSP 350 is a program that allows a user to create a custom calendar system. The user may create a custom calendar system by modifying an existing calendar system or creating an entirely new calendar system. CCSP 350 starts (352) when invoked by MSP 200. The user then enters the yearly progression for the custom calendar (354). The yearly progression is the order in which the years progress, which may be sequential, as in the Gregorian calendar, or may by cyclical, as in the Chinese calendar. The user may also create a formula for yearly progression, if desired. The user then enters the number of months for the custom calendar system year (356). The user then enters the number of days for each custom calendar system month (358). The number of days in each custom calendar system month may be constant, as in the Bahai calendar, or may vary from month to month, as in the Gregorian calendar.

Figure 13:
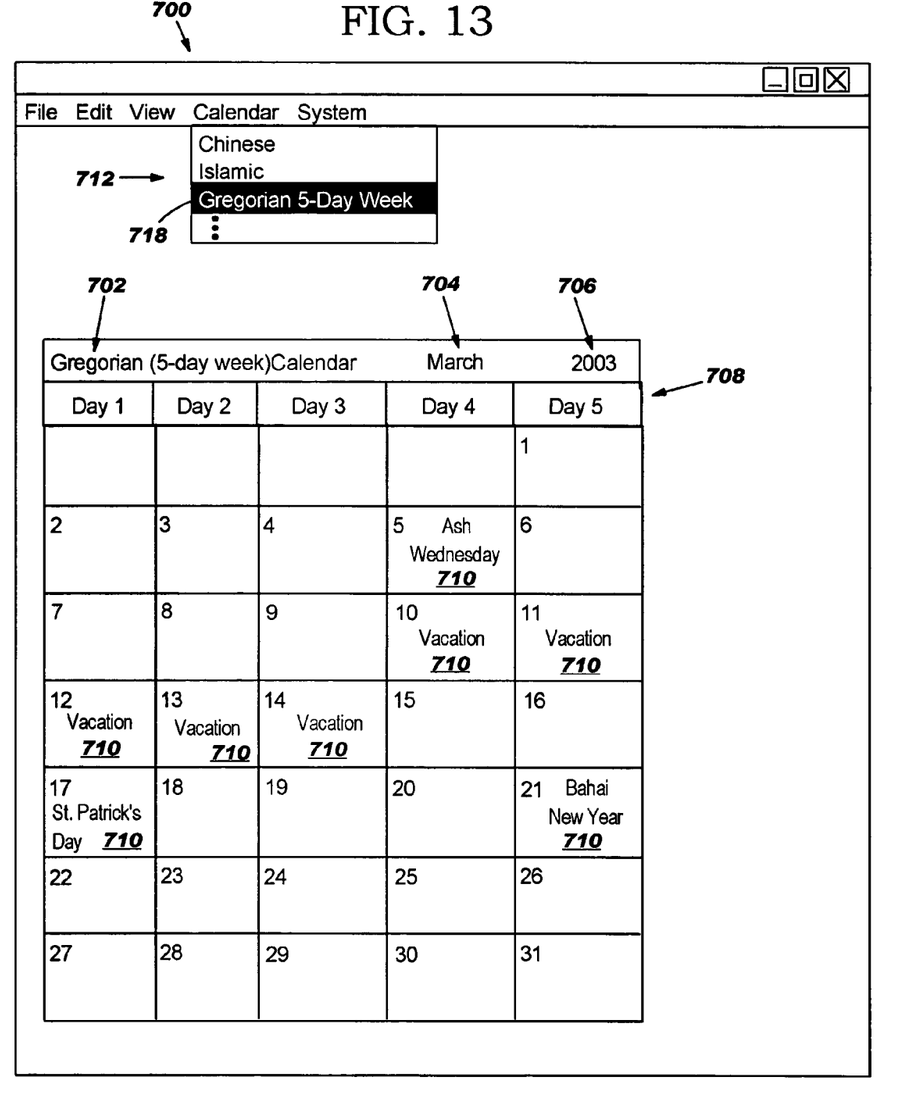
FIG. 13 is an illustration of the GUI displaying a custom calendar system created by the present invention.

The user then enters the number of days per custom calendar system year (360). Normally, the number of days per custom calendar system year will be the sum of the number of days per month over all of the months. However, if desired, the user can specify intercalendary days, such as those found in the Bahai calendar. Step 358 is also where the user can specify the leap year date and formula, if desired. The user then enters the number of days per custom calendar system week (362). The user then enters the reference date for the custom calendar system (364). The reference date in the custom calendar system is the date in the custom calendar system which corresponds to day 0 in the generic calendar system. The user then enters the names for the years, months, and days in the custom calendar system (366). The user also enters a name for the custom calendar system at step 366. CCSP 350 saves the custom calendar system as a calendar system (368) then ends (370). The calendar system may be like calendar system 120 on FIG. 2. An example of a custom calendar system is illustrated in FIG. 13.

Figure 6:
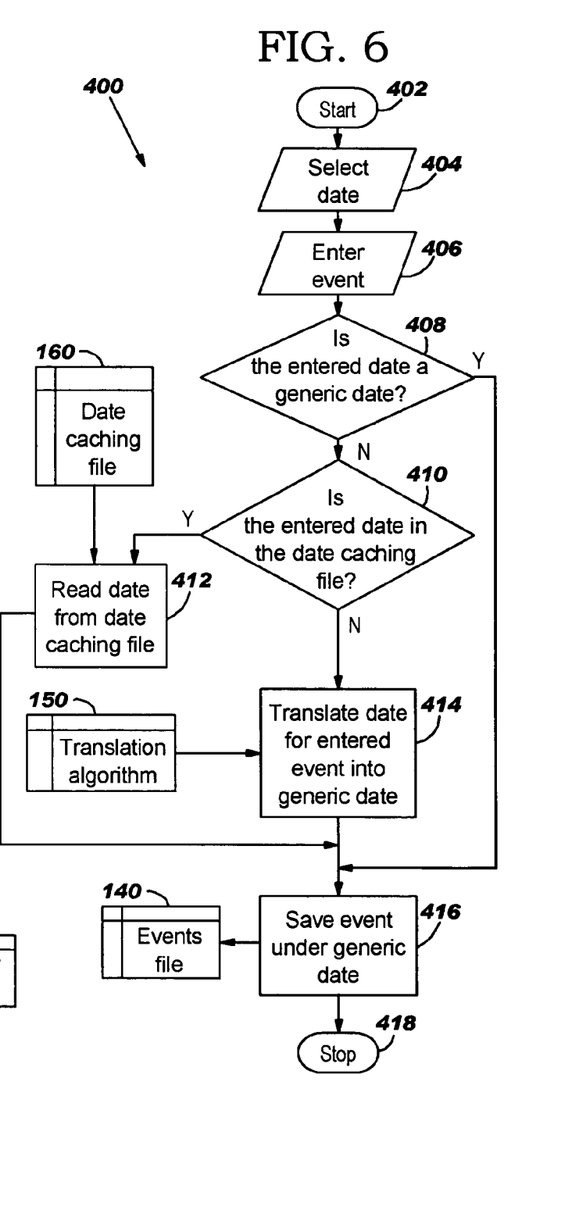
FIG. 6 is an illustration of the logic of the Event Conversion Program (ECP) of the present invention.

Turning to FIG. 6, the logic of Event Conversion Program (ECP) 400 is illustrated. ECP 400 is a program that allows the user to configure the settings for the present invention. ECP 400 starts (402) when invoked by MSP 200. The user then selects a date to enter an event (404). The selected date may be a generic date or a date in any of the calendar systems. The user then enters the event description including the time of the event, if applicable (406). ECP 400 then makes a determination whether the entered date is a generic date (408). If the entered date is a generic date, then ECP 400 proceeds to step 416. If the entered date is not a generic date, then ECP 400 makes a determination whether the entered date is in the date caching file (410). If the entered date is in the date caching file, ECP 400 reads the date from the date caching file (412) and proceeds to step 416. The date caching file may be like date caching file 160 in FIG. 2.

At step 410, if the selected date is not in the date caching file, ECP 400 translates the date for the event into a generic date (414). ECP 400 uses a translation algorithm to translate the calendar system date into the generic date. The algorithm measures the number of days that have passed in the calendar system since the reference date. The number of days that have passed is the generic date. If the calendar date is before the reference date, then the algorithm counts the number of days until the reference date. The translation algorithm may be like translation algorithm 150 in FIG. 2. An example of the algorithm using Jan. 1, 0000 as the reference date and the Bahai calendar system would look like:

```
// translate month/day/year format to generic days passed since 0AD
public int dateToDays(int month, int day, int year)
{
    // March 21st, 1844 begins the Bahai calendar
    // 3/20/1844=673221 days
    // number of years we have counted in the Bahai calendar
    int yearspassed=year-1;
    // number of days we have counted in the Bahai calendar,
    // "getDaysPassed" computes number of days that have passed in the current
    // Bahai year
    int totaldays=getDaysPassed(month,year)+day+yearspassed*365;
    // add an extra day for each leap year we've passed...every 4 years, minus every
    // 100, plus every 400
    // then subtract out 447 leap days that occured up to and including 1844..those are
    // accounted for in 673221
    totaldays+= (yearspassed+1844)/4-(yearspassed+1844) / 100 +
(yearspassed+1844) / 400 - (447);
    // we add 673221 to compute the number of "generic" days passed, based on the
    // number of Bahai days passed.
    // the returned result is the number of "generic" days passed, which any other
    // calendar-type implementation
    // can translate into it's own month/day/year representation
    return totaldays+673221;
}
```

Persons of ordinary skill in the art are aware of how to create translation algorithms for other calendar systems. ECP 400 then saves the event under the generic date in the events file (416). The events file may be like events file 140 in FIG. 2. ECP 400 then ends (418).

Figure 7:
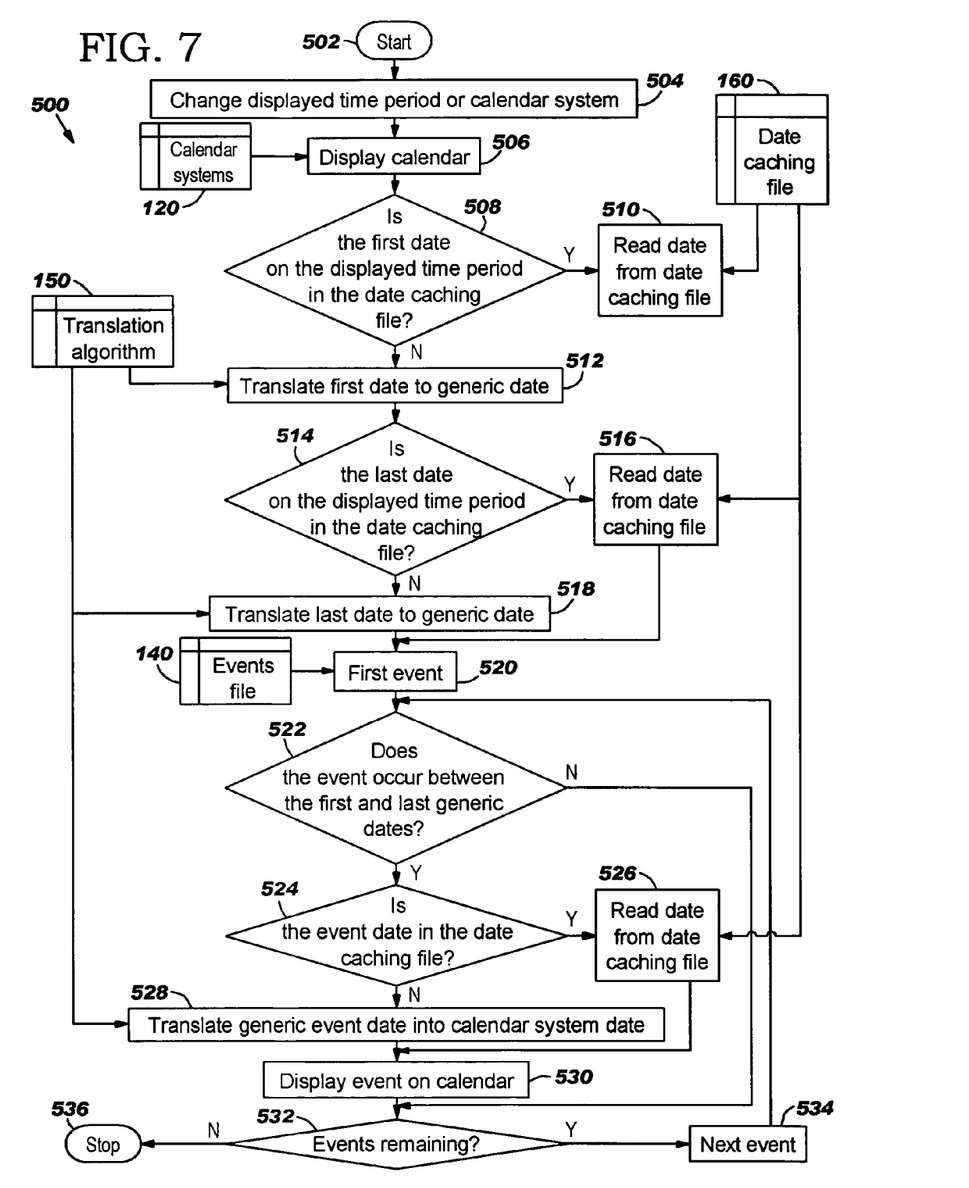
FIG. 7 is an illustration of the logic of the Display Program (DP) of the present invention.

Turning to FIG. 7, the logic of Display Program (DP) 500 is illustrated. DP 500 is a program that allows the user to display the calendar systems of the present invention. DP 500 starts (502) when invoked by MSP 200. The user then changes the displayed time period or the calendar system (504). The user may change the calendar system by selecting a new calendar system from the menu. Alternatively, the user may select a new time period from the menu, such as a year, a month, a week, or a day. The user may also change the current time period, such as selecting March if February is currently displayed. Persons of ordinary skill in the art are aware of other selections that a user can make in a calendar program that will require the calendar program to display a new time period. DP 500 then displays the selected calendar system for the selected time period (506). The selected calendar system may be any calendar system stored within the memory of the present invention. In displaying the selected calendar system, if the previously displayed month was February in the Gregorian calendar system and the user selects March, DP 500 displays the month of March in the Gregorian calendar system.

Because the date caching file records dates which have been previously translated, the present invention only needs to translate the dates for those events which are not in the date caching file. Only translating the dates which have not been previously translated allows the present invention to perform fewer translation calculations that the prior art methods. Returning to FIG. 7, DP 500 determines if the first date on the displayed date is in the date caching file (508). If the first date is in the date caching file, DP 500 reads the generic date from the date caching file (510) and proceeds to step 514. If the first date is not in the date caching file, then DP 500 translates the first displayed date into a generic date (512). DP 500 then determines if the last date on the displayed date is in the date caching file (514). If the last date is in the date caching file, DP 500 reads the generic date from the date caching file (516) and proceeds to step 520. If the last date is not in the date caching file, then DP 500 translates the last displayed date into a generic date (518).

Because not all of the events occur within a single displayed time period, the present invention only needs to translate the dates for those events which occur on the displayed time period. Only translating the displayed dates allows the present invention to perform fewer translation calculations that the prior art methods. Returning to FIG. 7, DP 500 goes to the first event in the events file (520). DP 500 then determines whether the event occurs between the first and last generic dates for the displayed time period (522). When making the comparison in step 522, the event will be considered to be between the two generic dates if the event occurs on one of the two generic dates. If the event does not occur between the first and last generic dates for the displayed time period, DP 500 proceeds to step 532. If the event occurs between the first and last generic dates, DP 500 determines if the event date is in the date caching file (524). If the event date is in the date caching file, DP 500 reads the calendar system date from the date caching file (526) and proceeds to step 530. If the event date is not in the date caching file, DP 500 translates the generic event date into the calendar system date (528).

DP 500 uses the translation algorithm to translate the calendar system date into the generic date. The algorithm, working in reverse, translates from the generic date to the calendar system date. An example of the algorithm using Jan. 1, 0000 as the reference date and the Bahai calendar system would look like:

```
// translate generic days passed since 0 AD into month/day/year format for this
// calendar-type
    public DateObject daysToDate(int days)
    {
        // first subtract out the 673221 so we have the number of days passed in Bahai
    // days
        days-=673221;
        int year=1;
        // then start counting off the full Bahai years that have passed
        while(days>366)
        {
            if(isLeapYear(year))
            {
                days-=366;
            }
            else
            {
                days-=365;
            }
            year++;
        }
        if(days==366 && !isLeapYear(year))
        {
            year++;
            days-=365;
        }
        // having computed what Bahai year we are in, compute what Bahai month we are
    // in
        int month=1; // start checking at month 2 since month 1 is 0 days
        // if we hit month 20, stop the loop, the day must be in month 20
        for(month=1;month<20 && days>getDaysPassed(month+1,year);month++)
        {
        }
        month--;
        // finally, figure out how many Bahai days into the month we are
        int dayofmonth=days-(getDaysPassed(month+1,year));
        DateObject returntime=new DateObject(month+1,dayofmonth,year);
        // return the Bahai date in the form month/day/year
        return returntime;
    }
```

Persons of ordinary skill in the art are aware of how to create translation algorithms for other calendar systems. DP 500 then displays the event on the calculated date on the displayed time period for the selected calendar system (530). DP 500 then makes a determination whether there are events remaining in the events list (532). If there are events remaining, DP 500 proceeds to the next event (534) and returns to step 522. If there are no events remaining, DP 500 ends (536).

Figure 8:
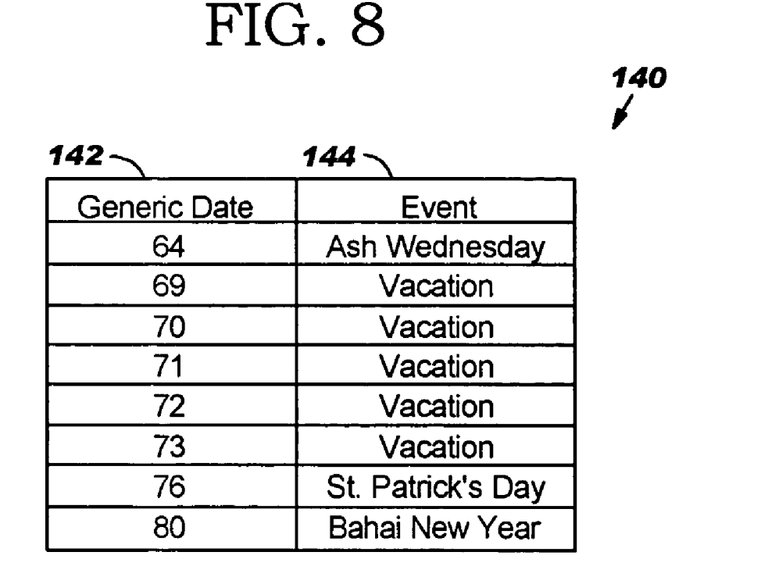
FIG. 8 is an illustration of the events file of the present invention.

Turning to FIG. 8, events file 140 is illustrated. Events file 140 comprises data entries comprising two parts: generic date 142 and event 144. Events file 140 may optionally comprise the time of the event. Generic dates 142 are the generic dates calculated in step 414 of FIG. 6. Events 144 are the events entered in step 406 of FIG. 6. Events file 140 does not limit the number of entries. The number of events is only limited by the storage capacity of the computer in which the present invention is implemented.

Figure 9:
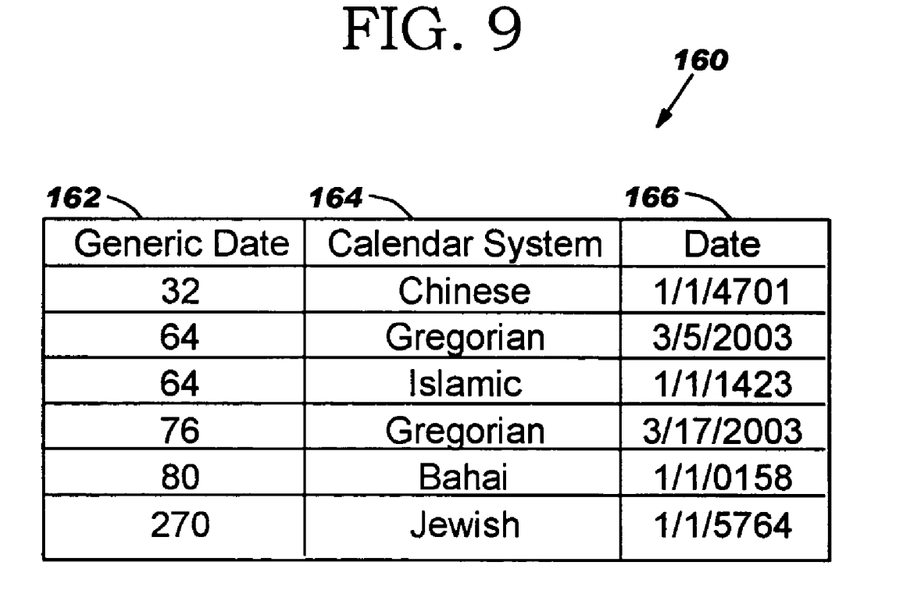
FIG. 9 is an illustration of the date caching file of the present invention.

Turning to FIG. 9, date caching file 160 is illustrated. Date caching file 160 depicted in FIG. 9 uses Dec. 31, 2002 as a reference date. Date caching file 160 comprises data entries comprising three parts: generic date 162, calendar system 164, and date 166. Generic dates 162 are the generic dates calculated in step 414 of FIG. 6. Calendar system 164 is the calendar system for date 166 in the same row. Date 166 is the calendar system date corresponding to the generic date in the same row. Date 166 is in the MM/DD/YYYY format, but may be in any format known to persons of ordinary skill in the art. Date caching file 160 does not limit the number of entries. The number of events is only limited by the storage capacity of the computer in which the present invention is implemented.

Figure 10:
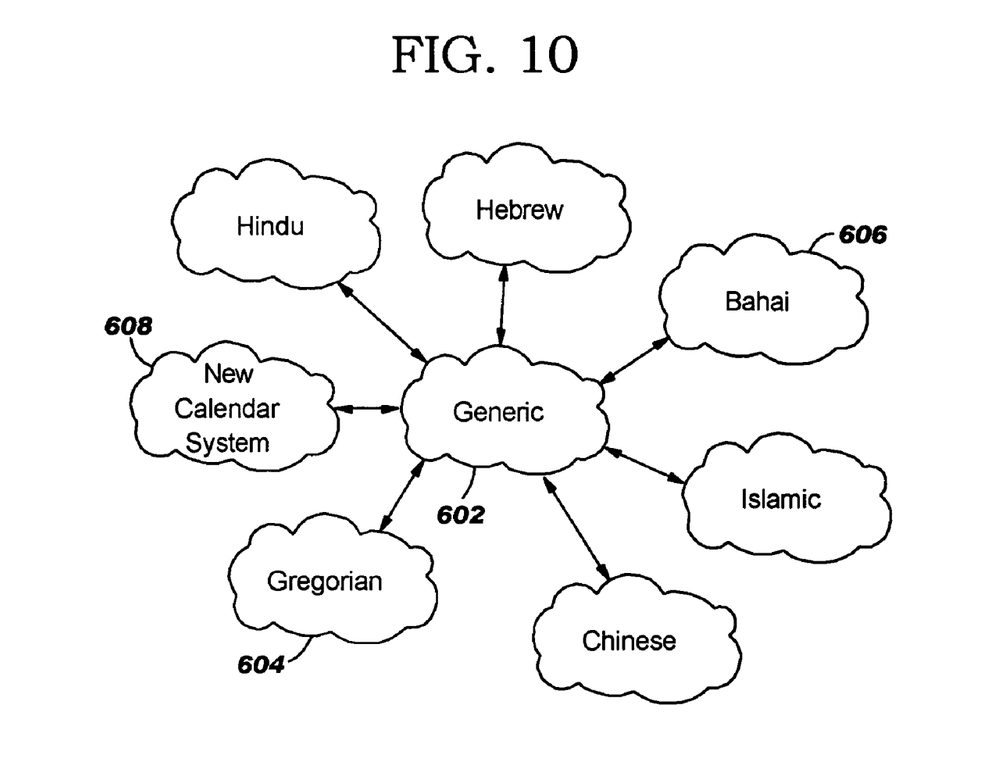
FIG. 10 is an illustration of the relationship between the calendar systems of the present invention.

Turning to FIG. 10, the relationship between the calendar systems of the present invention is illustrated. One of the needs identified in the art is the need to limit the number of required translation formulas. As can be seen in FIG. 10, each calendar system of the present invention only needs a translation algorithm to/from the generic calendar system. For example, the addition of new calendar system 608 to the present invention means that a translation algorithm is only needed between new calendar system 608 and generic calendar system 602. The user may then view different calendar systems including Gregorian 604, Bahai 606, and new calendar system 608 via generic calendar system 602.

Figure 11:
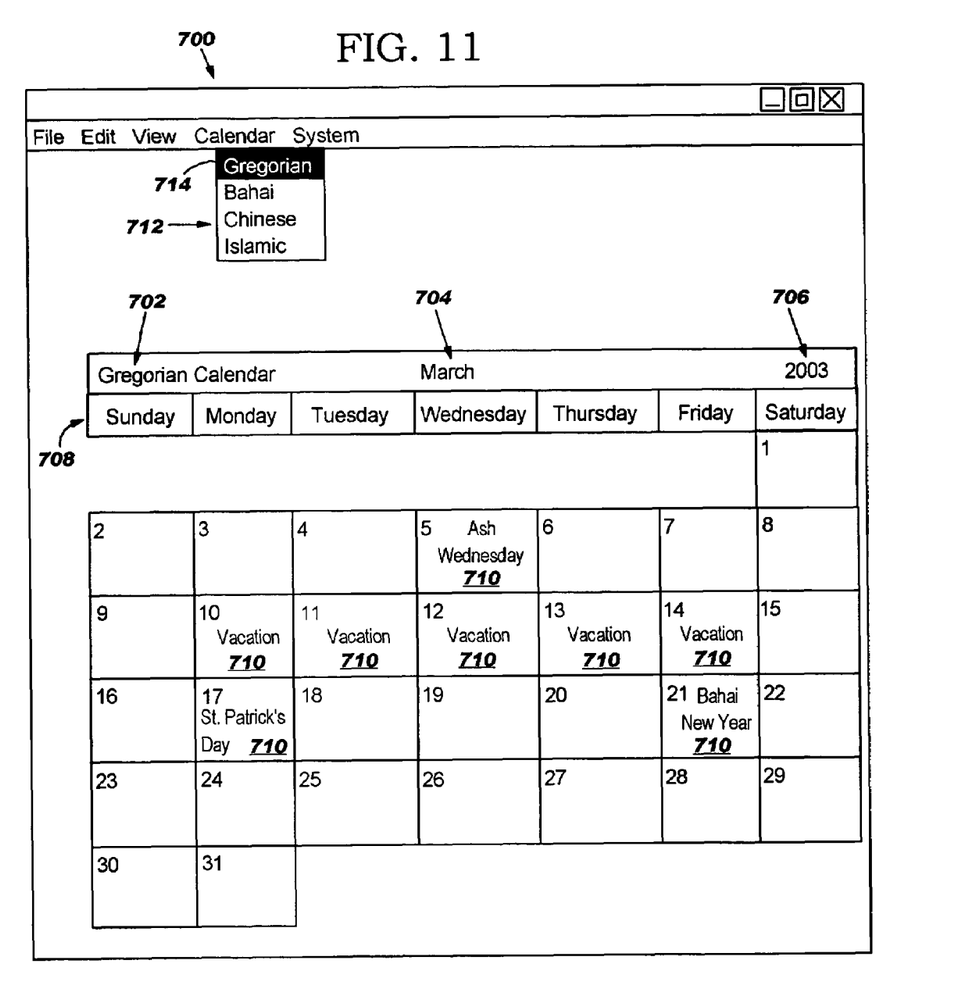
FIG. 11 is an illustration of the Graphical User Interface (GUI) displaying the Gregorian calendar of the present invention.

Turning to FIG. 11, GUI 700 of the present invention is illustrated. GUI 700 displays the calendar system of the present invention in a windows or similar environment. GUI 700 depicts the Gregorian calendar of the present invention. GUI 700 depicts calendar system 702, month 704, year 706, days of the week 708, and events 710. Calendar system 702, month 704, year 706, and week 708 are all calendar system specific. Calendar system 702, month 704, year 706, and week 708 are also specific to the displayed time period. GUI 700 also depicts events 710 in the displayed calendar system dates. The user may select the Gregorian calendar displayed in FIG. 11 by choosing Gregorian calendar option 714 from menu 712.

Figure 12:
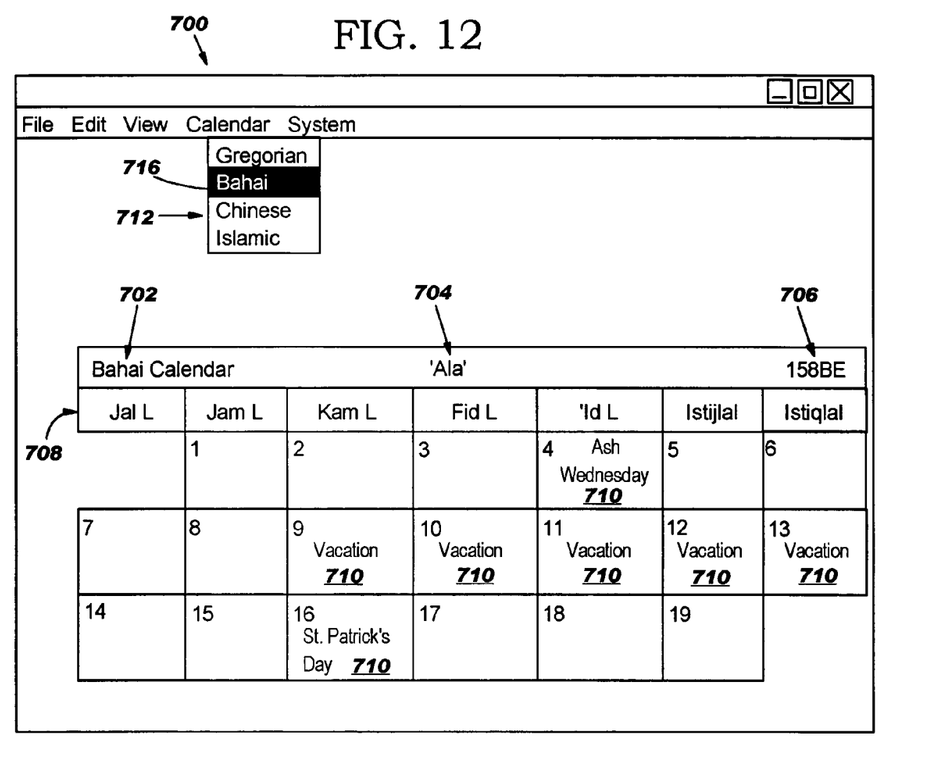
FIG. 12 is an illustration of the GUI displaying the Bahai calendar system of the present invention.

Turning to FIG. 12, GUI 700 of the present invention is illustrated. GUI 700 depicts the Bahai calendar of the present invention. Similar to the illustration in FIG. 11, GUI 700 in FIG. 12 depicts calendar system 702, month 704, year 706, days of the week 708 and events 710. As can be seen in FIG. 12, calendar system 702, month 704, year 706, and days of the week 708 have changed to the Bahai calendar system upon selection of Bahai calendar option 716 from menu 712. GUI 700 also depicts events 710 in the displayed calendar system dates.

Turning to FIG. 13, GUI 700 of the present invention is illustrated. GUI 700 depicts a custom calendar system created by the user. In FIG. 13, the custom calendar system is a modified Gregorian calendar containing a five day week. The user may want to select a calendar with a modified week for several reasons. For example, if the user works a set schedule in which the user is at work for two days and off work for three days throughout the entire year, then a five day week is preferable to a seven day week. The five day week would be preferable because the user's working days line up in columns using the modified week of the present invention. Modified weeks are also useful in large scale production operations in which a reoccurring event has a cycle time. The user could then set the modified week length equal to the event cycle time. Persons skilled in the art are aware of other instances where a modified calendar system would be advantageous. Similar to the illustration in FIGS. 11 and 12, GUI 700 in FIG. 13 depicts calendar system 702, month 704, year 706, days of the week 708 and events 710. As can be seen in FIG. 13, calendar system 702, month 704, year 706, and days of the week 708 have changed to the modified Gregorian five day week calendar system upon selection of modified Gregorian five day week calendar option 718 from menu 712. GUI 700 also depicts events 710 in the displayed calendar system dates.

With respect to the above description, it is to be realized that the optimum dimensional relationships for the parts of the invention, to include variations in size, materials, shape, form, function, manner of operation, assembly, and use are deemed readily apparent and obvious to one of ordinary skill in the art. The present invention encompasses all equivalent relationships to those illustrated in the drawings and described in the specification. The novel spirit of the present invention is still embodied by reordering or deleting some of the steps contained in this disclosure. The spirit of the invention is not meant to be limited in any way except by proper construction of the following claims.

What is claimed is:

1. A method for scheduling events in a plurality of calendar systems comprising:
   accessing a time period for a calendar system, the time period containing a first date and a last date;
   determining if a generic event date occurs between a first generic date and a last generic date;
   responsive to the determination that the generic event date occurs between the first generic date and the last generic date, determining if the generic event date is in a date caching file;
   responsive to the determination that the generic event date is not in the date caching file, translating the generic event date into an event date;
   transmitting the event date to the time period;
   wherein the first generic date is the generic date for the first date displayed on the time period; and
   wherein the last generic date is the generic date for the last date displayed on the time period.

2. The method of claim 1 wherein the steps further comprise:
   responsive to the determination that the generic event date is in the date caching file, reading the event date for the generic event date from the date caching file.

3. The method of claim 1 wherein the steps further comprise:
   determining whether the first date on the time period is in the date caching file;
   responsive to the determination that the first date on the time period is in the date caching file, reading the generic first date for the first date from the date caching file;
   responsive to the determination that the first date on the time period is not in the date caching file, translating the first date into the first generic date;
   determining whether the last date on the time period is in the date caching file;
   responsive to the determination that the last date on the time period is in the date caching file, reading the last generic date for the last date from the date caching file; and
   responsive to the determination that the last date on the time period is not in the date caching file, calculating the last generic date for the last date.

4. The method of claim 1 wherein the calendar system is a custom calendar system, wherein a user can define the name and length of a year, a month, a week, and a day in the custom calendar system.

5. The method of claim 1 wherein the calendar system is a Gregorian calendar system.

6. The method of claim 1 wherein the calendar system is a non-Gregorian calendar system.

7. A method for displaying an event on a calendar, comprising:
- changing a displayed calendar system by a user;
- displaying a time period for the calendar system;
- determining if a generic event date of the event in an event file occurs between a first generic date and a last generic date for the displayed time period;
- responsive to the determination that the generic event date occurs between the first generic date and the last generic date, determining if the generic event date is in a date caching file;
- responsive to the determination that the generic event date is not in the date caching file, translating the generic event date into an event date; and
- displaying the event date on the time period for the displayed calendar system;
- wherein the first generic date is the generic date for a first date displayed on the time period;
- wherein the last generic date is the generic date for a last date displayed on the time period;
- wherein a user can define the name and length of a year, a month, a week, and a day of the calendar system;
- wherein an event file comprises a list of events wit corresponding generic dates upon which the events occur; and
- wherein a generic date is a single integer that does not contain years, months, or weeks, and is the number of days that have passed in the calendar system since a reference date.

* * * * *